United States Patent [19]

Edeline et al.

[11] 3,842,285

[45] Oct. 15, 1974

[54] METHOD AND A DEVICE FOR THE MECHANICAL MODULATION OF A PARTICLE FLUX

[75] Inventors: Jean-Claude Edeline; Justin Lavergne, both of Orsay, France

[73] Assignee: Commissariat A L'Energie Atomique, Paris, France

[22] Filed: May 11, 1973

[21] Appl. No.: 359,406

[30] Foreign Application Priority Data

May 19, 1972 France .............................. 72.18201

[52] U.S. Cl. .................................. 250/497, 250/514

[51] Int. Cl. ............................................... G21f 5/00

[58] Field of Search ........... 250/492, 493, 494, 497, 250/514

[56] References Cited

UNITED STATES PATENTS 3,159,748 12/1964 Aikens, Jr. .......................... 250/497

*Primary Examiner*—Archie R. Borchelt
*Assistant Examiner*—Davis L. Willis
*Attorney, Agent, or Firm*—Cameron, Kerkam, Sutton, Stowell & Stowell

[57] ABSTRACT

A plate which carries particle-emitting sources and non-emitting dummy sources arranged in alternate and uniformly spaced relation is driven in rotation so as to transfer the sources periodically and in alternate sequence in front of a location at which a modulated flux is received such as the measuring cell of a gamma-absorption content meter. The non-emitting material which constitutes the dummy sources has a composition and density such that inhomogenities are created during the movement of said sources and are of the same type as those produced by the emitting sources but relatively displaced by one half-period.

5 Claims, 1 Drawing Figure

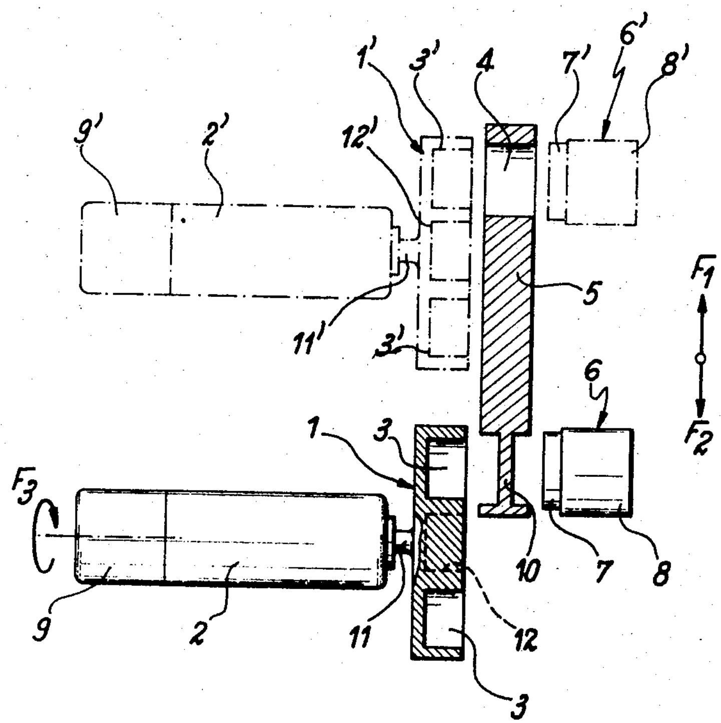
1'
3'
4
7'
6'
8'
9'
2'
12'
5
F1
11'
3'
6
F2
1
3
F3
10
7
8
9
2
11
12
3

METHOD AND A DEVICE FOR THE MECHANICAL MODULATION OF A PARTICLE FLUX

This invention relates to a method and to a device for mechanical modulation of a particle flux; as used in this description, the term "particles" is considered in its broadest sense and extends in particular to photons, with the result that modulation of the intensity of a radiation comes within the purview of the invention.

It is known that, in order to measure a physical quantity which is masked by background noise, the useful signal must be modulated with a precise period and phase in order to be able to detect said signal by means of a synchronous amplifier.

When the physical quantity to be measured is a flux of particles or a radiation, the choice of the modulator is often directed to a mechanical device; a modulator of this type usually comprises: the source which emits particles or radiation and has a fixed position, a collimator, then a movable shutter which periodically interrupts the path of the particles or the radiation in order to produce a modulated flux. Devices of this type can be employed, for example, for modulating sources of visible light, infrared radiation, ultra-violet radiation, X-rays or $\alpha$-rays, neutrons or particles of different types. Measurements are carried out in some cases in the presence of a similar physical quantity, namely a particle flux or a radiation, either by reason of the fact that said quantity is pre-existent and that it cannot be removed (in which case it constitutes a parasitic phenomenon) or because it is desired to study the influence of said quantity on the results of the measurement or on the action of the modulated signal. Reference can be made by way of example to the study of fluorescence or phosphorescence of material as induced by modulated radiation in the presence of a constant flux of the same type; X-ray fluorescence analysis of a substance which in turn emits nuclear radiation; the study of the response of a nuclear radiation detector to a modulated flux in the presence of a constant radiation; absorptiometric measurement of the density of a mixture containing fission products.

The mechanical modulation devices which have been employed up to the present time comprise one or a number of particle or radiation emitting sources; between these latter and the location at which it is desired to receive the modulated flux, there is interposed a shutter which periodically interrupts the beam. Said shutter is constituted by a sample of material having sufficient thickness to absorb approximately 90 percent of the intensity of the beam.

These known devices introduce a periodic variation in the position of the shutter at a frequency equal to the modulation frequency of the beam; in the event of a pre-existent flux or radiation, this carries a disadvantage in that a spurious synchronous modulation of said flux or radiation is necessarily introduced as a result. In point of fact, either the pre-existent flux is periodically attenuated by the shutter if the radiation source is located on the side remote from the measurement location with respect to the modulator or alternatively, if the source is on the same side as said measurement location, the flux undergoes a reflection which varies at a frequency equal to the beam modulation frequency.

In both cases, it is not possible to eliminate said spurious modulation if the movable shutter is not dispensed with. Moreover, it is usually desired to obtain maximum intensity of modulation of the useful flux; it is therefore necessary to ensure that the shutter in the closed position absorbs the largest possible fraction of the flux and that, in the open position, the flux is of maximum intensity. These two conditions result in a compromise in the choice of the thickness of the shutter and this compromise is all the more unsatisfactory as the linear coefficient of absorption in respect of the radiation considered is of lower value.

The known mechanical modulation devices are employed in particular in gamma-absorption content meters which are employed for measuring the heavy-element concentration of solutions containing gamma emitters which constitute background components.

The concentration aforesaid is related to the intensity I of a gamma-ray beam after traversal of a measuring cell which contains the solution by the relation: $I = I_o \exp - kc$, where $I_o$ designates the beam intensity prior to traversal of the measuring cell, $c$ designates the concentration in grams per liter, and $k$ designates a coefficient which depends on the element whose concentration is to be measured and on the thickness of the sample.

In content meters of this type, the gamma radiation is usually supplied by a source of $Am^{241}$. But the presence in the solution contained in the measuring cell of fission products which emit gamma rays having various energies gives rise to a spurious signal, the intensity of which can be one thousand times higher than that of the useful signal I. It is therefore essential to eliminate this spurious signal completely; the most effective and simple method consists in modulating the useful gamma-ray beam with a known frequency and phase and in demodulating said beam by means of a synchronous amplifier.

In order to produce the modulated gamma flux, there is usually placed between the source of $Am^{241}$ and the measuring cell a shutter constituted by rotating blades which interrupt the beam periodically. In fact, this solution does not make it possible to secure total freedom from the spurious flux since a fraction of this latter is reflected periodically by the blades and is therefore modulated at the same frequency as the useful signal. It is in that case no longer possible to separate said flux by means of the synchronous amplifier. Moreover, the pipes which serve to supply the solution to the measuring cell are liable to constitute sources of gamma radiation which are separated from the detector by the rotating blades; in this case, a spurious modulated flux is again created.

The invention overcomes the disadvantages which have just been set forth and is accordingly directed to a method of mechanical modulation of a particle flux, wherein said method essentially consists in causing particle-emitting sources and non-emitting sources or dummy sources to move past periodically and in alternate sequence in front of the location which is intended to receive a modulated flux, the nature of said dummy sources being such that inhomogeneities are created during the movement of said sources and are of the same type as those produced by the emitting sources but relatively displaced by one half-period.

The invention is also concerned with a device for carrying out said method, wherein said device essentially comprises a plate carrying particle sources and dummy sources arranged in alternate and uniformly spaced relation and means for driving said plate so as to displace said sources periodically and in alternate sequence in front of the location which is intended to receive a modulated flux, the nature of said dummy sources being such as to create inhomogeneities in the physical properties of said plate of the same type as those produced by the emitting sources but relatively displaced by one half-period.

In the particular case in which the device according to the invention is employed in a gamma-absorption content meter, the device comprises a measuring cell in which is circulated a solution having a concentration of heavy elements to be measured and containing spurious gamma-ray emitters, said cell being inserted within a stationary plate of heavy metal, a solid disc which is parallel to said plate and coupled to a driving shaft which is fixed at the center of said disc, at least one pair of sources carried by said disc at an equal distance from its center, each pair being constituted by a gamma-radiation emitting source and a source which has the same shape but is non-emitting and the different sources being angularly spaced at uniform intervals, a drive unit for causing the shaft which is fixed to the solid disc to rotate at a uniform speed, the relative positions of the various elements of the content meter being such that the different sources pass in turn in front of said measuring cell during their movement of rotation.

Further properties and advantages of the present invention will be brought out by the following description in which one form of construction of the device according to the invention is given by way of explanation but not in any limiting sense, said device being employed in a content meter.

Reference is made to the single accompanying FIGURE which is a schematic illustration of the content meter as a whole in both positions of utilization, the position indicated in chain-dotted lines being the position of measurement.

Said content meter essentially comprises:

a. a measuring cell 4 in which is circulated the solution having a concentration of heavy elements to be measured and containing spurious gamma-ray emitters, said cell 4 being inserted within a plate 5 of heavy metal (steel or lead, for example), b. a solid disc 1 coupled to a driving shaft 11 which is fixed at the center of said disc, said solid disc being adapted to carry emitting sources and dummy sources which will be defined hereinafter, c. a motor 2 which serves to drive the shaft 11 in rotation (in the direction shown by the arrow $F_3$), d. a detector 6.

The assembly consisting of disc 1 and detector 6 is capable of undergoing a displacement in translational motion (as shown by the arrows $F_1$, $F_2$) from the reference position (shown in full lines) to the measurement position (in chain-dotted lines).

In the FIGURE, the various elements of the device which have been displaced in translational motion so as to come to the measurement position are designated by the same numerals as in the reference position but the prime index is assigned thereto.

The gamma-ray flux which it is desired to modulate in order to measure the concentration of the solution which circulates within the cell 4 is produced by two sources 3 of $Am^{241}$ oxide which are located in diametrically opposite positions on the disc 1.

By reason of the fact that the presence of said sources produces inhomogeneities in the physical properties of the disc 1 during rotation of this latter and that said inhomogeneities would have the undesirable effect of modulating the spurious gamma radiation emitted by the solution and reflected by the disc 1 at the same frequency as the gamma flux emitted by the sources 3, two non-emitting or dummy sources are added at locations which are relatively displaced by an angle of 90° with respect to the sources 3. Said sources 12 are chosen so as to create inhomogeneities having the same value as those which are due to the sources 3 but displaced in phase by one half-period.

The sources 3 are radioactive sources containing $Am^{241}$ oxide with graphite and are encapsulated within a stainless steel jacket.

The dummy sources 12 are identical with the sources 3, the only difference being that the $Am^{241}$ oxide is replaced by an oxide which does not emit gamma radiation.

It is an advantage to employ for the dummy sources a mixture having a composition and density which are very similar to the mixture employed for the emitting sources 3, for example a mixture of iron and aluminum.

The plate 5 absorbs at least 95 percent of the flux emitted by the sources 3.

The detector 6 is constituted by a scintillator 7 of very small thickness (between 0.2 and 0.5 mm) which is associated with a photoelectric cell 8. The scintillator is placed behind the measuring cell 4 and receives a flux whose intensity varies periodically with the positions of the sources. The amplitude of the periodic flux variation is a function of the concentration of heavy elements in the solution which circulates within the cell 4; the phase of said periodic variation is determined by means of the alternating-current signal derived from a small rotating-magnet alternating-current generator 9 which is coupled to the motor 2. Said signal also serves to control the electronic assembly which regulates the speed of the driving motor, said motor being supplied with direct current.

The plate 5 is provided with a recess for accommodating a reference gauge 10 which, after translational displacement of the assembly consisting of sources 3 and detector 6, serves to check the good performance of the apparatus.

It will be noted that, in the position of recalibration (as shown in full lines), the detector 6 is largely protected by the plate 5 against the gamma radiation emitted by the fission products contained in the solution which circulates within the measuring cell 4 and the pipes for the supply and discharge of solution. This has the effect of reducing exposure of the detector 6 and electronic circuitry to ionizing radiations and of minimizing the risk of radiation damage.

The operation of the device according to the invention is as follows:

In order to carry out a measurement, the assembly consisting of sources 3' and detector 6' is placed in front of the measuring cell 4 (in the position shown in chaindotted lines), then in front of the reference gauge 10. After synchronous amplification and detection, the signal derived from the detector 6' is proportional to the flux I after traversal of the cell 4 and the value of $I_o$ is proportional to the signal which is obtained when the sourcedetector assembly is placed in front of the reference gauge 10 (in the position shown in full lines).

The values of I and $I_o$ being known, the concentration of heavy elements contained in the solution is deduced therefrom by means of the formula $I = I_o \exp - kc$.

By making use of suitably selected dummy sources 12, the invention offers the advantage of obtaining a modulation of the spurious beam as a result of a reflection or of a transmission which varies periodically at a frequency which is different from that of the useful beam.

Moreover, by means of sources having equal intensities, the modulator produces a modulated flux having higher intensity than is the case with known modulators which utilize the displacement of a moving absorbent since the sources are capable of moving past at a very short distance from the location (cell 4) at which the modulated flux is intended to be produced; this advantage is all the more marked as the radiation which it is desired to produce has higher penetrating power.

The plate 5 increases the contrast between the maximum and minimum values of the flux emitted by the sources 3; it performs the function of absorbent between the location at which the modulated flux is intended to be received and the emitting sources when these latter are at a distance from said location (position in full lines); a further advantage offered by the plate lies in the fact that it does not prevent the emitting sources from coming very close to said location (position shown in chaindotted lines).

As will be clearly understood, the present invention has been described in the foregoing solely by way of explanation without any limitation being implied and any detail modifications can accordingly be made therein without departing either from the scope or the spirit of the invention.

What we claim is:

1. A method of mechanical modulation of a particle flux, comprising the steps of causing particle-emitting sources and non-emitting sources or dummy sources to move past periodically and in alternate sequence in front of the location receiving a modulated flux, and creating inhomgeneities by said dummy sources during the movement of said sources of the same type as those produced by said emitting sources but relatively displaced by one half-period.

2. A device for mechanical modulation of particle flux comprising a plate carrying particle sources and dummy sources arranged in alternate and uniformly spaced relation and means for driving said plate so as to displace said sources periodically and in alternate sequence in front of the location to receive a modulated flux, said dummy sources creating inhomogeneities in the physical properties of said plate of the same type as those produced by said particle sources but relatively displaced by one half-period.

3. A device according to claim 2 as employed in a gamma-absorption content meter, comprising a measuring cell in which is circulated a solution having a concentration of heavy elements to be measured and containing spurious gamma-ray emitters, said cell being inserted within a stationary plate of heavy metal, a solid disc parallel to said plate and coupled to a driving shaft fixed at the center of said disc, at least one pair of sources carried by said disc at an equal distance from its center, each pair including a gamma-radiation emitting source and a source which has the same shape but is non-emitting, the different sources being angularly spaced at uniform intervals and a drive unit for rotating said shaft at a uniform speed, the relative positions of the various elements of the content meter being such that the different sources pass in turn in front of said measuring cell during their movement of rotation.

4. A device according to claim 3, wherein the solid disc includes four sources angularly displaced by 90°, two diametrically opposite particle sources containing $Am^{241}$ oxide and two dummy sources identical with said two particle sources but in which the $Am^{241}$ oxide is replaced by an oxide which does not emit gamma radiation.

5. A device according to claim 3, wherein said plate of heavy metal includes a recess, a reference gauge in said recess a gamma-ray detector on the other side of said plate with respect to the solid disc and opposite to the periphery of said disc, and a source-detector assembly movable in translational motion in a direction parallel to said plate, said source-detector assembly being located in oppositely-facing relation to said reference gauge in one end position thereof and in oppositely-facing relation to said measuring cell in the other end position thereof.

* * * * *